Nov. 2, 1943. G. H. DOWTY 2,333,095
MOTOR VEHICLE SUSPENSION SYSTEM
Filed Jan. 11, 1940 2 Sheets-Sheet 2
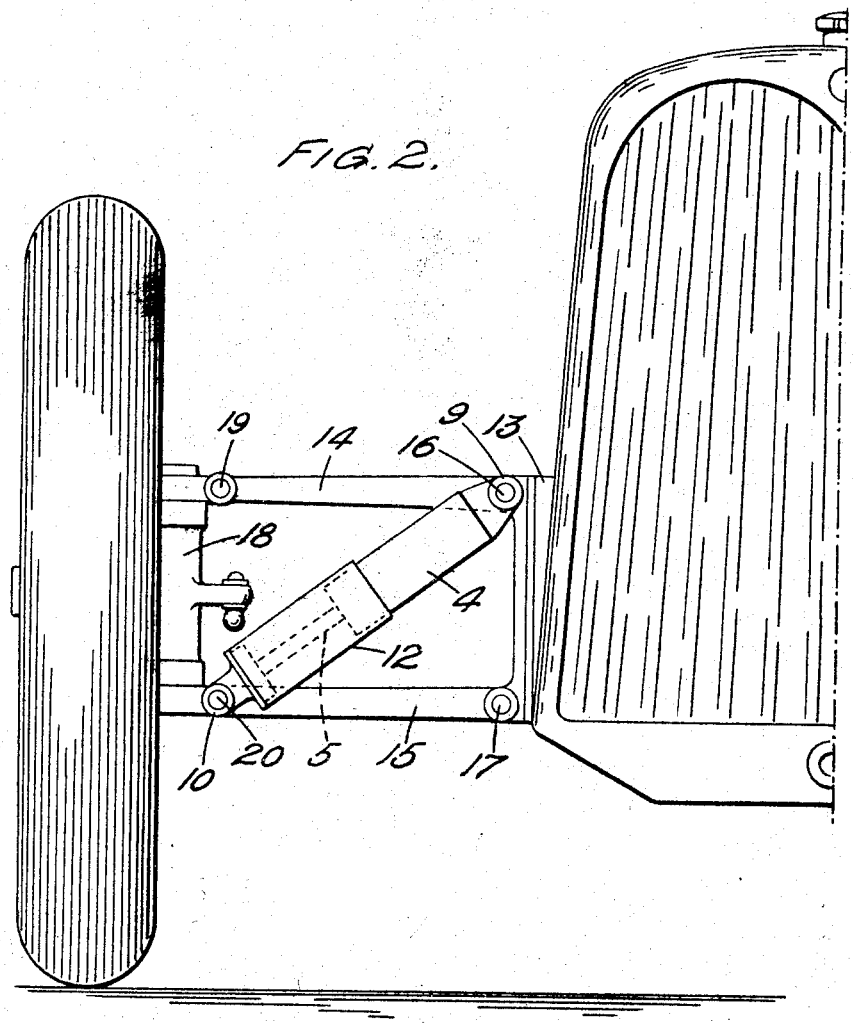
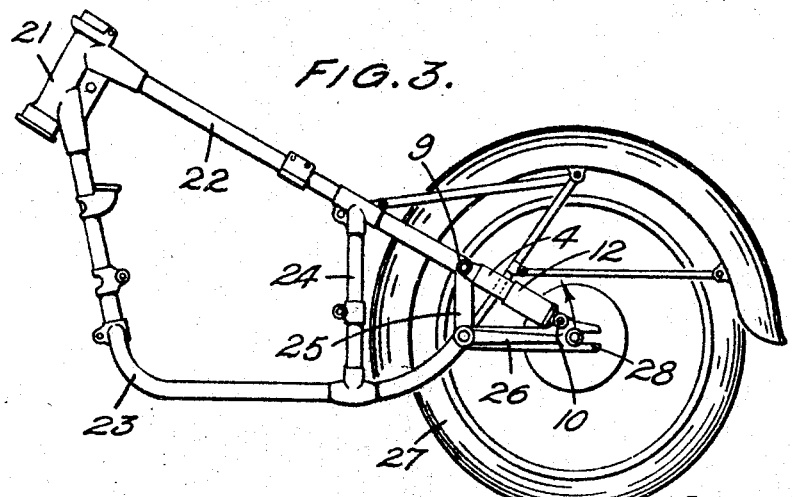
Inventor,
George H. Dowty Patented Nov. 2, 1943

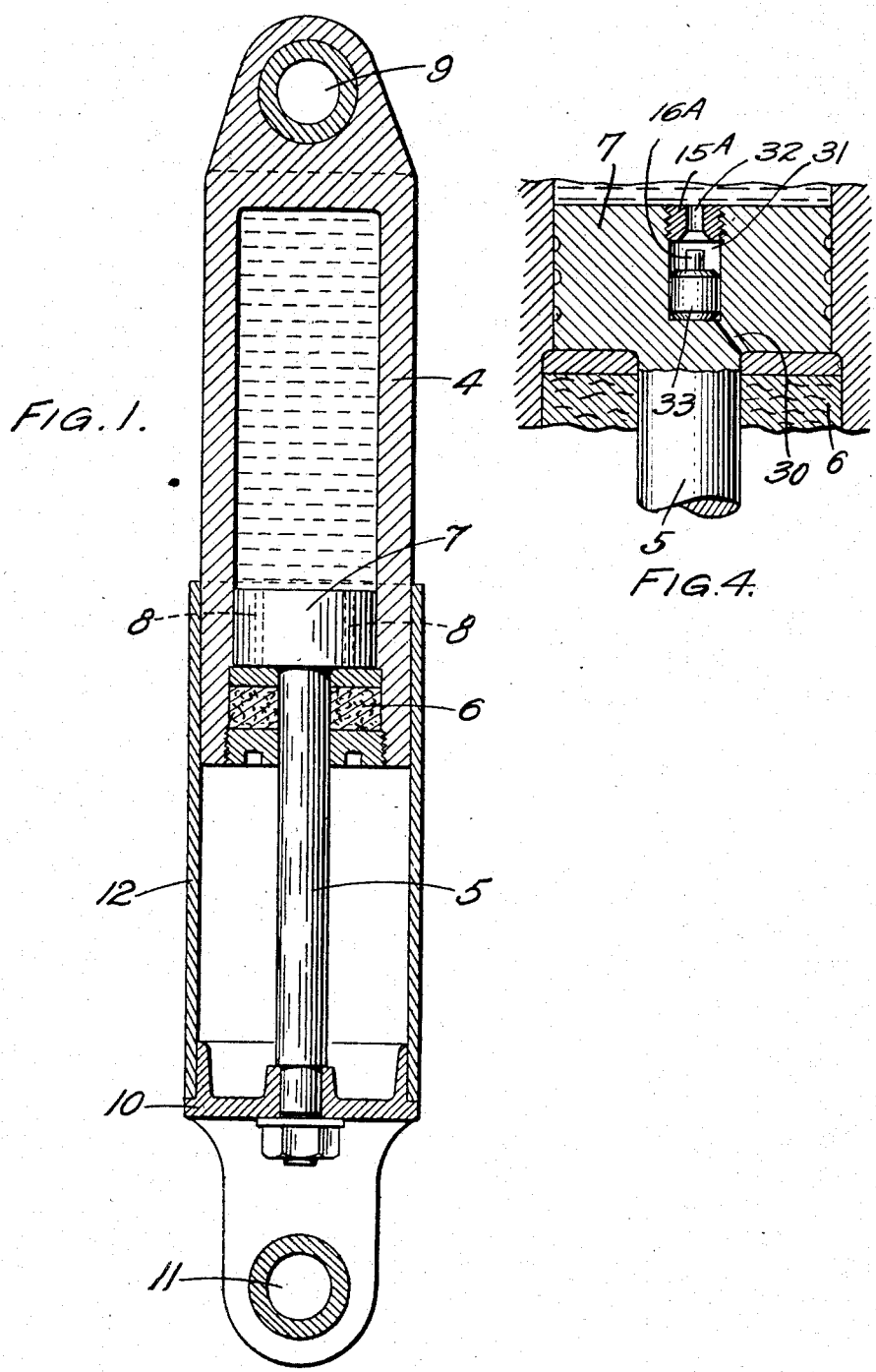

2,333,095

UNITED STATES PATENT OFFICE 2,333,095

MOTOR VEHICLE SUSPENSION SYSTEM

George Herbert Dowty, Cheltenham, England

Application January 11, 1940, Serial No. 313,401
In Great Britain January 17, 1939

8 Claims. (Cl. 267—64)

This invention relates to resilient suspension systems of vehicles. It is concerned with shock-absorber means, within which term I include devices which are practically purely resilient in action, and devices which as well as being resilient in action also dissipate energy and are therefore damped.

It is an object of this invention to provide a suspension system involving shock absorber means of light weight and small dimensions for a given load and stroke, with good wearing properties, and of which manufacturing and particularly maintenance, are simple.

The particular object of this invention is to provide a body of liquid under compression in which the elastic restoring forces of the compressed liquid serve satisfactorily to restore the shock absorber mechanism to its original position, as well as effectively to absorb the shock under impact. The resilient resistance is due to the elastic restoring forces of the compressed liquid which is compressed to the extent of 20,000 pounds per square inch, 50,000 pounds per square inch or more.

It is a further object to associate with such compression means means for damping the shock absorption and otherwise regulating it.

It is a further object of the invention to mount a shock absorber unit depending for its resilience upon elastic resilience of liquid compressed at high pressure in such a manner that the unit is relieved of material bending loads and provides the requisite resilient resistance by axial deflection alone.

It is a further object of the invention to mount such a shock absorber of compact self-contained form in a manner readily accessible for dismantling, replacement, repair et cetera to which end it is preferred to mount such a shock absorber by means of pivot attachments in a deformable structure yieldable under shock absorbing load.

It is a further object of the invention to provide such a shock absorber involving in a single chamber absorber not only resilient means but also damping means.

It is deemed to be desirable in shock-absorbers that there should be little or no pressure in the unloaded condition, substantial pressure being generated only by the application of loads, and for convenience I term such a shock-absorber "self-energising." The invention when fully applied, seeks to afford the attributes and functions above indicated in an economical and practicable way, and to provide a vehicle suspension system including shock-absorber means of which maintenance will be reduced to a minimum.

The principle underlying the present invention is the employment in automobile suspension systems of the restoring forces of a liquid compressed when the shock-absorber means is deflected. A clear distinction must be emphasized in regard to this statement; where I write of "liquid" I am referring to a substance which is stable liquid in the conditions (e. g. of temperature) to which it will be subjected in use. The word "liquid" is to be distinguished from gas or vapour. It has been found that suitable liquids include those which are used in hydraulic actuating systems or in shock-absorbers, and they are in the nature of thin, light oils or oil mixtures; this does not, however, exclude the possibility of other liquids being employed, for example, n-pentane.

In a very simple form of this invention, in which the suspension system has a shock absorber means comprising a cylinder filled with liquid and a plunger entering one end of the cylinder, the plunger moves in when the shock absorber means deflects, movement occurring in a sense purely axial and essentially free of loads tending to induce bending.

According to another feature of this invention, there may be energy dissipation or damping afforded by the provision of flow resistance means for the said or another liquid, which means may be within a damping head on the plunger. Practically the whole of the liquid which is subjected to compression may be caused to pass through the flow resistance in a maximum working stroke of the plunger for which the apparatus is designed.

The invention also includes certain structural features, not necessarily broadly claimed per se, such as the employment of a certain form of damping device, and the employment of certain dispositions of suspension systems which, when including other types of shock-absorber means, are not necessarily novel. Another subordinate feature worthy of mention is the attachment of the chamber and the plunger by pin or like joints for affording angular freedom, to obviate any substantial bending loads being imposed in these parts, so that they work purely in end-load.

By the term "suspension system" I mean an arrangement of parts or elements adapted yieldingly to support the main structure of a vehicle, being interposed or connected between such main structure and the so-called "unsprung" parts, i. e. axles and wheels, which are ordinarily employed as sub-structures and which ultimately transmit weight, and running or landing loads, of the complete vehicle, to the ground, track, road, or other surface, upon which running occurs. For convenience the main structure will be referred to as the vehicle, and the "unsprung" parts will be referred to as the sub-structure.

The invention will now be described with the aid of the accompanying drawings, which are largely diagrammatic and in which:

Figure 1 is a sectional elevation of a vehicle shock-absorber according to the invention;

Figure 2 is a fragmentary view of a motor vehicle independent front wheel suspension system including such a shock-absorber; and Figure 3 illustrates the suspension system of a motor-cycle including similar shock-absorber means.

Figure 4 is a cross-sectional view showing a shuttle valve for use in the device of Figure 1.

Figure 1 shows a typical arrangement of shock-absorber unit for mounting in a vehicle suspension. Such a unit comprises a cylinder 4 which is filled with liquid. A plunger 5 enters the liquid through an appropriate glanding arrangement 6 and carries at its inner end a damping head 7. The damping head 7 preferably fits the bore of the cylinder 4, but it is to be understood that its function is not that of compression, for the damping head per se occupies a constant space within the cylinder 4. It will be observed that the damping head 7 is provided with through ports 8 indicated in dotted lines, and the function of the damping head therefore is to provide for flow resistance resulting from the passage of liquid from one side of the damping head to the other. In actual fact, the same flow resistance could be provided by making the damping head 7 smaller than the bore of the cylinder 4, but it is preferred that the damping head shall fit the bore in order to assist in providing a unit which is somewhat resistant to bending.

Compression of the liquid is effected by entry of the plunger 5 into the liquid, and it will be observed that the plunger 5 is smaller in cross section relative to the bore of the cylinder 4, with the result that in compression up to 50,000 pounds per square inch or even greater, which is practical in units according to the present invention, quite a considerable axial displacement is afforded. Where such high pressures are being dealt with, it is deemed desirable that the unit should be relieved entirely of bending loads, and to such an end it is therefore proposed always to mount the shock-absorbing unit for pivotal connection. The cylinder is therefore provided at its outer end with a pin joint 9, whereas the outer end of the plunger is secured to an end lug 10 also having a pin joint at 11. The sleeve 12 is optional, and is in fact provided to assist in supporting the projecting end of the plunger 5, so that the unit itself may be at least in some measure, inherently resistant to bending.

In the embodiment of the invention shown with reference to Figure 2, which deals with an independent front wheel suspension system, there extends from the side of the chassis indicated at 13, a parallelogram structure comprising the upper arm 14 and the lower arm 15. The arms 14 and 15 at their inner ends are pivoted to the chassis 13 or a bracket carried thereby, the pivots being indicated at 16 and 17 respectively. Parallelism of the arms 14 and 15 is maintained by the attachment of the outer ends of the arms to the king pin housing and stub axle assembly indicated for instance at 18. The outer ends of the arms 14 and 15 are pivoted to the king pin housing at 19 and 20 respectively. It will be appreciated that the parallelogram structure allows the wheel to rise and fall, and resilient restraint to such rising and falling movement is provided by a shock-absorber unit pivotally connected across a diagonal of the parallelogram structure. It will be observed that the parts of the shock-absorber have been indicated by the same reference numerals as have been employed in the description relating to Figure 1, for instance the pin joint 9 and 10 are connected to the pivots 16 and 20. Likewise the cylinder 4 is apparent together with the optional strengthening sleeve 12, the plunger 5 being indicated in dotted lines.

Figure 3 illustrates by way of example a shock-absorber as shown in Figure 1 forming part of the resilient suspension system of a motor-cycle frame. The frame comprises a steering head 21 and tubes 22, 23, the top tube 22 being bifurcated to the rear of the vertical tube 24, and the bottom tube 23 being likewise bifurcated. These tubes are interconnected at their rear ends by further vertical tubes 25. A pair of wheel stays or radius rods 26 support the wheel 27, and between the wheel spindle fork fitting 28 and the junction of the tubes 22 and 25 is mounted on each side of the wheel 27 a shock-absorber as shown in Figure 1, of which the cylinder 4, strengthening sleeve 12 and pivot end connections 9 and 10 are visible. Clearly, upward movements of the sub-structure comprising the parts 26, 27 and 28 are resisted by the shock-absorbers.

Although in Figure 1 there has been illustrated a damping arrangement which is perhaps of the simplest possible form, it is to be understood that any convenient damping means may be provided; for instance there is described in my co-pending application Serial No. 313,399 filed January 11, 1940, a particularly desirable form of damping means including a shuttle valve by which the resistance passage means is afforded different degrees of damping according to the direction of movement. Such an arrangement can obviously be very conveniently applied in constructions such as hereinbefore described.

The primary function of the damping head is energy dissipation; with that object a liquid flow resistance passage connects the two sides of the damping head 7, and this can best be followed by an inspection of Figure 4. The resistance passage comprises one or more ducts 30 from the underside of the damping head leading into a cylindrical bore 31 which is partially closed by a screwed-in plug 15A having a central aperature 32. Within the bore 31 there is slidable a valve-like element 33 of cylindrical external shape. When in the "down" position the element 33 rests on the bottom floor of the bore 31, and when in the "up" position a small head 16A partly enters and therefore partly blocks the aperture 32, the inner entrance to which may be somewhat tapered. The element 33 has a clearance between its periphery and the wall of the bore 31, which is carefully selected because this is the clearance which in the main determines the flow resistance through the damping head 7. The resistance passage constituted by the clearance is thus an annular passage, and it is found more practicable to arrive at a desired flow resistance by affording such clearance than it would be, for example, to drill a very minute hole with accuracy. Moreover, it should be evident that the element 33 will be carried upwardly or downwardly according to the sense of liquid flow, and such movement may serve to prevent the lodging of foreign matter in the clearance. In any case it is extremely improbable that foreign matter would produce any substantial stoppage of such an annular clearance. The movements of the element 33 also (by the cooperation of the head 16A with the aperture 32) provide more resistance to flow in an upward than a downward sense, and therefore produce a greater damping effect to downward movements of the damping head 7 than to upward movements thereof, so far as the inherent resistance to flow of the resistance means is concerned.

It will be understood that I desire to comprehend within my invention such modifications as come within the scope of the claims and the invention.

What I claim is:

1. In a vehicle suspension system, resilient means connected between sprung and unsprung parts and comprising a pressure-tight chamber, a plunger extending into said chamber, a head on said plunger slidably engaging the bore of said chamber, flow-resistance means carried entirely by said headed plunger and moving therewith within the chamber and liquid filling the maximum available space in said chamber with the plunger fully extended; said plunger being yieldable with respect to the chamber under axial load to compress the entrapped liquid and afford resilient resistance, whereas restricted passage of liquid through said flow-resistance means affords damping of plunger movement both in yield and rebound.

2. A motor vehicle suspension system including a collapsible wheel-supporting structure, and resilient means tending to resist deformation of said collapsible structure pivotally connected thereto in such manner as to afford said resilient means freedom from substantial bending loads in deflection due to end load, said resilient means comprising a unit including a liquid-filled cylinder, a plunger slidably extending into said cylinder to compress the liquid elastically, a damping head on said plunger slidably fitting within the bore of said cylinder, resistance passage means in said damping head for damping movement of said plunger, and sleeve means telescopically supported by said cylinder cooperating with said plunger for bracing the projecting part thereof whereby to afford resistance to bending.

3. In a vehicle suspension system, resilient means connected between sprung and unsprung parts and comprising a chamber closed by a plunger slidable axially in the chamber and having pressure-tight sliding engagement through a wall of the chamber, a head on the plunger slidably fitting the bore of the chamber, liquid entrapped between the headed plunger and the interior of the chamber filling the maximum available space in said chamber, and compressible under axial load on the plunger to afford resilient resistance, and resistance-passage means through the head to afford restricted flow for liquid therethrough for damping plunger movement in both directions of travel.

4. In a vehicle suspension system, resilient means connected between sprung and unsprung parts and comprising a pressure-tight chamber, a plunger slidably extending into the chamber to afford resilient resistance due to the elastic restoring forces of liquid filling the maximum available space in the chamber and compressible by plunger movement under axial load, a head on the plunger and slidably fitting the bore of the chamber, flow-resistance passage means carried by the plunger and constituted by a port for liquid to pass from side to side of the head, and shuttle-valve means in said port to exercise damping control different in one direction of plunger travel from that exercised in the other.

5. In a vehicle suspension system, an articulated frame collapsible under suspension loads connecting a road wheel to the vehicle chassis, and telescopic resilient means comprising a pressure-tight chamber with means of pivotal connection to said frame, a plunger having means of pivotal connection to an opposed element of said frame, and liquid filling the maximum available space in said chamber, one of said pivotal connections being fixed in relation to said chassis, whereas the other swings mainly vertically whilst involving minor variation in axial length to said telescopic resilient means and consequent variation in compression of the entrapped liquid to afford a liquid spring unit.

6. An arrangement as set forth in claim 5, in which the plunger carries a damping head partitioning said chamber, and includes restricted passage means to damp resilient telescopic action by resisting flow of liquid from one side to the other of said head.

7. A motor vehicle suspension system including a collapsible wheel-supporting structure, and resilient means tending to resist deformation of said collapsible structure connected thereto in such manner as to afford said resilient means freedom from substantial bending loads in deflection due to end load, said resilient means comprising a unit including a liquid-filled chamber, a plunger extending into said chamber to compress the liquid elastically when moved thereinto, and a damping head on said plunger within the chamber having uniformly acting flow resistance means to resist the flow of liquid between opposite ends of said chamber simultaneously with compression or expansion of the liquid by movement of said plunger therein.

8. A motor vehicle suspension system including a collapsible wheel-supporting structure, and resilient means tending to resist deformation of said collapsible structure pivotally connected thereto in such manner as to swing bodily with said structure and afford said resilient means freedom from substantial bending loads in deflection due to end load, said resilient means comprising a unit including a liquid-filled cylinder, a plunger slidably extending into said cylinder to compress the liquid elastically, a damping head on said plunger slidably fitting within the bore of said cylinder, and resistance passage means within said damping head having a resistance to flow of fluid between opposite ends of the cylinder that acts uniformly throughout the stroke of the damping head for damping movement of said plunger.

GEORGE HERBERT DOWTY.